J. A. SMITH.
PIPE REMOVER.
APPLICATION FILED JUNE 1, 1912.
1,053,446.
Patented Feb. 18, 1913.
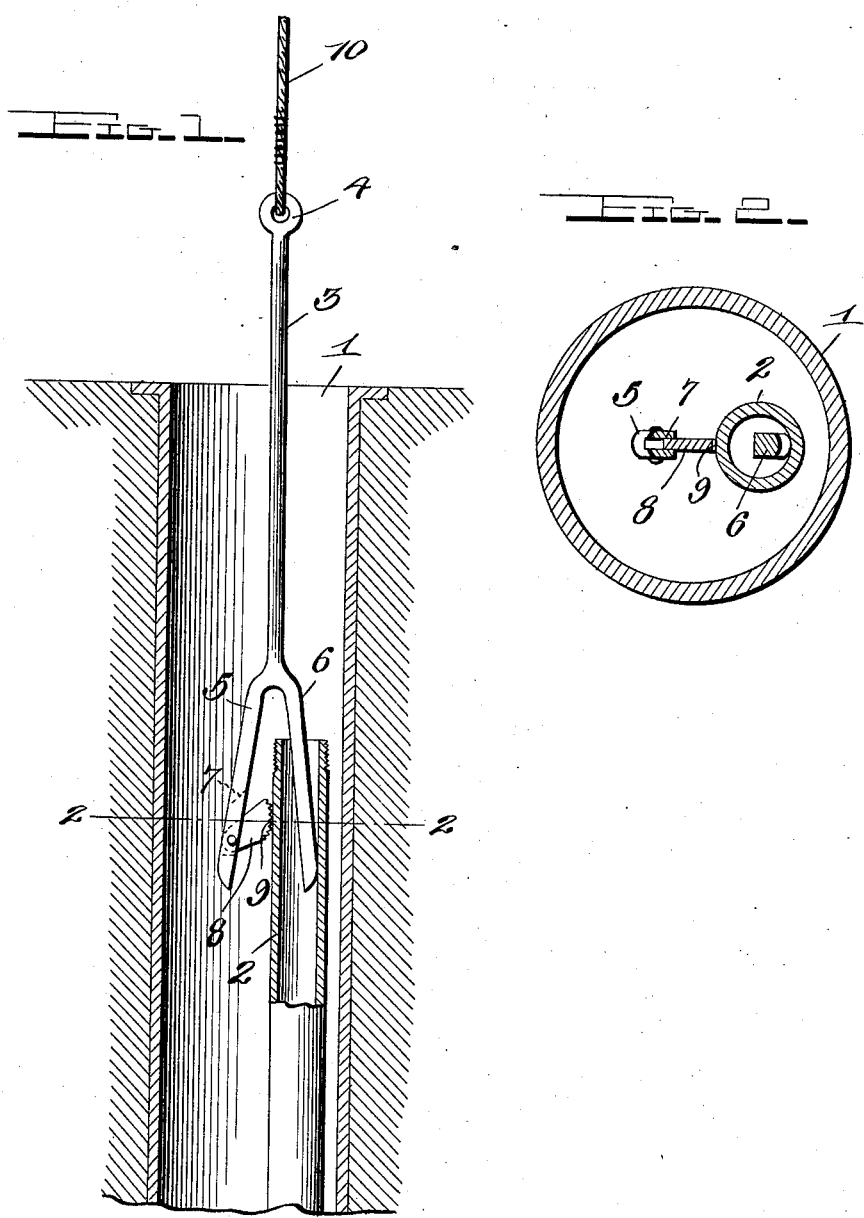
Witnesses
Chas. L. Griesbauer.
A. B. Norton.
Inventor
J. A. Smith,
By Watson E. Coleman,
Attorney

UNITED STATES PATENT OFFICE.

JOSEPH A. SMITH, OF WELLSBORO, PENNSYLVANIA.

PIPE-REMOVER.

1,053,446.   Specification of Letters Patent.   Patented Feb. 18, 1913.

Application filed June 1, 1912.   Serial No. 701,073.

*To all whom it may concern:*

Be it known that I, JOSEPH A. SMITH, a citizen of the United States, residing at Wellsboro, in the county of Tioga and State of Pennsylvania, have invented certain new and useful Improvements in Pipe-Removers, of which the following is a specification, reference being had to the accompanying drawings.

This invention comprehends certain new and useful improvements in pipe removers and relates more particularly to a device of this nature designed for use in removing water pipes from drilled wells.

The primary object of the invention is to provide a pipe remover which shall be simple in construction, efficient in operation and very cheap to manufacture.

The invention also aims to generally improve devices of this nature to render them more useful and commercially desirable.

With these and other objects in view as shall become more apparent as the description proceeds the invention consists in certain novel constructions and arrangement of parts as I shall hereinafter fully describe and claim.

In the embodiment of my invention I provide a rigid shank having formed on its lower end a pair of diverging prongs, one of said prongs being provided with a pivoted dog.

For a complete understanding of my invention, reference is to be had to the following description and accompanying drawing, in which—

Figure 1 is a side elevation of my invention showing the same in use. Fig. 2 is a transverse sectional view taken on the plane of line 2—2 in Fig. 1.

Referring to the drawings by numerals, 1 designates a well casing of the ordinary type and 2 designates a fluid conducting pipe within said casing. My device which is designed primarily for removing pipes from casings of this nature, comprises a body portion in the form of a cylindrical shank 3 having an eye 4 formed in the upper end thereof. The lower end of the shank 3 is bifurcated to form the diverging prongs 5 and 6, one of which is provided with a longitudinal slot 7. As shown, the slot is formed in the prong 5 near the lower end thereof, and has a dog 8 pivotally secured at one end between the walls of the slot. The dog extends inwardly and is provided with a serrated gripping edge 9. It will be noted that the dog has a limited upward swing about its pivot, and is prevented from swinging downward below a certain point by the lower wall of the slot 7.

In the operation of my device, a rope 10 is attached in the eye 4 and the tool is lowered within the casing 1 until the prong 6 enters the pipe 2. Now an upward pull on the rope 10 causes the pipe to be gripped tightly between the prong 6 and the dog 8. The dog bites into the outer wall of the pipe and prevents the same from slipping.

From the foregoing description in connection with the accompanying drawings, it will be apparent that I have provided a pipe removing tool of extremely simple structure.

It is to be understood that minor changes in shape may be made without departing from the spirit of the invention as defined by the claim.

Having thus described my invention, what I claim is:—

A pipe remover comprising a straight shank formed with an eye in one end, the other end of the shank being bifurcated to form diverging prongs, one of said prongs having a longitudinal slot therein, and a dog pivoted at one end between the walls of said slot, the dog being adapted to swing inwardly and bind against a hollow object surrounding the other prong.

In testimony whereof I hereunto affix my signature in the presence of two witnesses.

JOSEPH A. SMITH.

Witnesses:
 LEO L. STATTS,
 ALBERT C. FISHER.

Copies of this patent may be obtained for five cents each, by addressing the "Commissioner of Patents, Washington, D. C."